United States Patent [19]

Seymour

[11] 3,730,697

[45] May 1, 1973

[54] METHOD FOR SUPPORTING GLASS SHEETS WITH TONGS FOR HEAT TREATING

[75] Inventor: Samuel L. Seymour, Oakmont, Pa.

[73] Assignee: PPG Industries, Inc., Pittsburgh, Pa.

[22] Filed: Mar. 15, 1971

[21] Appl. No.: 124,485

[52] U.S. Cl. ..........................65/105, 65/112, 65/104
[51] Int. Cl. .............................................C03b 27/00
[58] Field of Search ....................408/1; 65/102, 105, 65/106, 112, 158, 174, 177, 154, 155, 156, 107, 104; 175/330

[56] References Cited

UNITED STATES PATENTS

| | | | |
|---|---|---|---|
| 2,941,338 | 6/1960 | Santschi | 51/81 |
| 2,996,061 | 8/1961 | Miller | 408/59 |
| 3,146,083 | 8/1964 | Barton, Jr. et al. | 65/177 X |
| 3,377,749 | 4/1968 | Shumaker | 51/8 |
| 2,237,982 | 4/1941 | Ferlito | 65/112 X |

*Primary Examiner*—Arthur D. Kellogg
*Attorney*—Chisholm & Spencer

[57] ABSTRACT

Marking glass sheets for tong processing.

10 Claims, No Drawings

METHOD FOR SUPPORTING GLASS SHEETS WITH TONGS FOR HEAT TREATING

BACKGROUND OF THE INVENTION

1. Field of the Invention

This invention relates to treating glass sheets, and particularly to the treatment of glass sheets that are processed into finished articles while engaged by tongs. In particular, the present invention is especially suited for making the tong gripping points in glass sheets of irregular outline to insure that the glass sheets are suspended in proper registration and properly oriented with respect to glass sheet shaping molds which shape the glass sheets to a desired shape so that the glass may fit within an opening such as a side window of an automobile and be capable of movement within a guide frame between a closed window position and an opened window position.

2. Description of the Prior Art

Traditionally, glass sheets supported by tongs for thermal treatment have been either of rectangular shape or other substantially symmetrical shape. Furthermore, such glass sheet shapes have been gripped by tongs and bent to cylindrical shapes. Under such circumstances, it was relatively simple to engage glass sheets having a straight upper edge by a plurality of tongs and have an operator determine by eye that each tong engage a different portion of the glass sheets a distance from the upper edge that approximated the distance by which each other tong gripped its corresponding glass sheet portion. However, as glass shapes required for fabrication became more complicated and the outlines of glass sheets to be treated departed significantly from the symmetrical outlines and shapes required previously, both the orientation of the glass sheet and its alignment between press bending molds became more important. Hence, it became more and more important to locate the points where the tongs grip the glass sheet with greater precision than is possible using an operator's estimation.

An early proposal involved marking the locations for gripping the glass with tongs by using ink to mark the tong gripping points. However, this proposed solution had several drawbacks. First of all, the ink tends to smear and also is difficult to wash off the glass after the glass is subjected to thermal treatment. Secondly, since it became necessary to handle larger glass sheets, the low friction coefficient between the marked portions of the glass sheets and the glass gripping elements of the tongs permitted many glass sheets to slide out of tong gripping engagement, thereby causing production losses.

SUMMARY OF THE INVENTION

The present invention provides an improvement in treating glass sheets which are processed to fabricate glass articles wherein each glass sheet is handled by tongs during at least a portion of its processing into a finished glass article, by drilling a small mark in each location of the glass sheet to be gripped by tongs during such processing. Preferably, a core drill is used to mark the dripping points and only one side of the glass need be drilled. The depth of the mark should be merely sufficient to be detectable but not so deep as to weaken the glass sheet appreciably. A depth of the mark of 0.001 inch to 0.010 inch is preferable.

DESCRIPTION OF THE PREFERRED EMBODIMENT

According to a preferred embodiment of the present invention, glass sheets are cut to an irregular outline conforming to the outline desired for the glass articles to be fabricated. The optimum tong gripping points are determined for each pattern to be handled to insure that each tong supports a substantially uniform proportion of the load carried by the set of tongs suspended from a conventional carriage so that the positions of the leading and trailing edges of the glass sheet are in proper relation to the carriage and the glass sheet is oriented in a desired relationship to the carriage. A typical carriage or car with multiple tong suspension is shown in FIG. 1 of U.S. Pat. No. 3,293,021 to George W. Stilley and Harold E. McKelvey, assigned to PPG Industries, Inc. The preferred tong locations are marked on the glass sheet using a small drill, for example, a diamond core drill which engages the upper surface of a glass sheet at a glass treating station for sufficient time to barely mark the glass. The marks so produced guide the operators when the latter engage the glass sheet with tongs in a subsequent operation.

In a typical commercial operation, glass sheets of rectangular blank sizes are received in stacks and unloaded at an unloading station of the type desired in U.S. Pat. No. 3,094,322 to Fred W. Kocher and Orville H. Rinne, assigned to PPG Industries, Inc. They are deposited on a conveyor where they are treated at several successive stations.

Usually, the first of these treatment stations is a cutting station where the glass sheet is oriented and aligned with a template that provides a guide for moving a cutting wheel over a curved, enclosed path defining the outline desired for the glass sheet to be processed. The marginal portion of the glass blank is then separated from the main portion of the glass sheet so that a sheet of the desired outline remains. A typical cutting apparatus is disclosed in U.S. Pat. No. 3,537,345 to Antonio Luppino, assigned to PPG Industries, Inc.

The cut edge of the glass is then seamed to smooth the edge of the glass and protect an operator from the danger of cutting his hand on the edge. A typical glass seaming apparatus is disclosed in U.S. Pat. No. 2,782,569 to Bruce D. Robbins, assigned to PPG Industries, Inc.

Another operation typical in the treatment of a glass sheet prior to any thermal process involves applying a trademark. A typical trademark application is disclosed in U.S. Pat. No. 3,377,749 to Lyle L. Shumaker, assigned to PPG Industries, Inc.

Another treatment step for certain articles to be processed is the drilling of one or more holes through the thickness of the glass. This is especially important in the case of automobile sidelites, where means for raising and lowering the window extend through the various apertures drilled through the glass article. A typical glass drilling apparatus is disclosed in U.S. Pat. No. 2,941,338 to Julius V. Santschi, assigned to PPG Industries, Inc.

The glass sheets can be marked to depict the optimum tong gripping points when they occupy any of the stations recited above. Then, after the series of processing steps enumerated above, the glass is washed and dried and moved to a tong loading station.

According to the present invention, one or more additional drills are provided at one of the treatment stations described hereinabove. The purpose of the additional drilling means is to mark the locations in the glass where tongs are used to engage the glass during its subsequent thermal processing. Preferably, the drilling means for marking the glass to indicate tong locations is incorporated in the cutting station or the trademark application station. However, it can also be incorporated at the drilling station or can be provided in a separate tong marking station prior to the washing and drying stations, if so desired.

Initially, when the present invention was first proposed, there was considerably resistance to incorporating it in a commercial production line. It was felt that using a drill to mark the tong locations would weaken the glass so that there would be glass loss due to breakage. However, the following benefits were found to exist when the present invention was used for marking tong engaging points by drilling the glass rather than marking with ink:

1. The glass was free from ink marks,
2. The small indication in the surface produced by the drill provided a positive means for locating the glass and eliminated any loss of glass due to slippage from the glass engaging elements of the tongs.
3. The drilled marks did not produce significant weakness of the glass sheets in the vicinity of the tong gripping points.

A typical drill for marking flat glass sheets is sold under the name of Super-Cut diamond core 3/16 inch diameter drill DCG-316 standard wall by Super-Cut, Inc., Chicago, Illinois. Such drills were rotated at 1,800 revolutions per minute with a 30 pound force applied for less than 1 second. Circular ring marks having a depth of between about 0.001 inch and 0.002 inch resulted. Marks of lesser depth are difficult to detect.

Successful drilling of ring marks about 0.010 inch deep were produced using about 100 pounds of force and a drill speed of 2,900 revolutions per minute for approximately one second. This is about the maximum depth of ring mark desired. Deeper marks tend to weaken the glass to a significant extent.

Core type drills are preferable to solid drills as they penetrate the glass more rapidly than solid drills, provide more easily detectable marks, and provide frictional areas that are more difficult to dislodge from glass gripping elements of tongs than marks provided by solid drills. In addition, core type drills have a longer life than solid drills and require less frequent replacement. This is particularly true when the glass engaging members of the tongs are in the form of discs described and claimed in U.S. Pat. No. 3,089,727 to William J. Hay, assigned to PPG Industries, Inc.

The drills mark the glass with the center of the mark about one-fourth inch inside the upper edge. This is sufficient distance from the edge to avoid significant edge distortion in the glass sheet when tongs grip the latter during thermal treatment incidental to shaping, yet within the border enclosed within a frame in which the shaped window is installed.

While the present invention has been described in terms of treating glass sheets of irregular outline to prepare the glass sheets for a shaping operation, it is also within the purview of the present invention to use the technique suggested in the handling of sheets of more symmetrical shape such as rectangular, oblong, circular, elliptical and other more regular shapes. The positive support provided by the drill marks improves the efficiency of the tong operation without impairing the optical properties of the resulting articles.

While the present invention has been described in connection with a press bending operation is is also suitable for use in other treatments of the glass such as coating operations, tempering operations, and even handling by tongs to transfer the glass from one station to another, for example, move the glass sheets through any special treatment station.

The form of the invention described above represents an illustrative preferred embodiment through it is understood that various changes may be made without departing from the gist of the invention which is defined in the claims which follow.

I claim:

1. In the fabrication of a glass article from a glass sheet, wherein said sheet is handled by tongs during at least a portion of its processing, the improvement comprising drilling a mark in a surface of said glass sheet at each location of said glass sheet to be gripped by tongs during said portion of said processing, said mark being drilled to a depth sufficient for detection by an operator loading said glass sheet into said tongs and insufficient to weaken the glass to a significant extent, and engaging said glass sheet by tongs at each said location so marked.

2. The improvement as in claim 1, wherein a core-type drill engages said glass sheet surface to impress a circular ring mark at each of said locations.

3. The improvement as in claim 1, further including cutting said glass sheet to an irregular outline conforming to the outline desired for the glass article to be fabricated.

4. The improvement as in claim 1, wherein said glass sheet is processed at several stations prior to said engagement by said tongs and said glass sheet is drilled to a depth of approximately 0.001 inch to approximately 0.010 inch to mark the preferred tong locations at a station where another glass processing step is employed.

5. The improvement as in claim 4, wherein said other processing step comprises cutting said sheet to outline.

6. The improvement as in claim 4, wherein said other processing step comprises applying a trademark to said sheet.

7. The improvement as in claim 4, wherein said other processing step comprises drilling a hole through the entire thickness of said glass sheet at a location spaced from each of said tong marking locations.

8. The improvement as in claim 1, wherein said drilled mark has a depth of approximately 0.001 inch to approximately 0.010 inch.

9. The improvement as in claim 1, wherein said mark is drilled into only one side of said glass sheet.

10. The improvement as in claim 1, wherein said mark is drilled with the center of the mark approximately one-fourth inch inside the upper edge of said glass sheet.

* * * * *